United States Patent
Seeliger

(10) Patent No.: US 6,768,773 B1
(45) Date of Patent: Jul. 27, 2004

(54) ARRANGEMENT FOR DETERMINING THE PHASE POSITION OF A DATA SIGNAL

(75) Inventor: Rolf Seeliger, Pinneberg (DE)

(73) Assignee: Koninklijke Philips Electronics N.V., Eindhoven (NL)

(*) Notice: Subject to any disclaimer, the term of this patent is extended or adjusted under 35 U.S.C. 154(b) by 617 days.

(21) Appl. No.: 09/723,134

(22) Filed: Nov. 27, 2000

(30) Foreign Application Priority Data

Nov. 26, 1999 (DE) .......................................... 199 56 947

(51) Int. Cl.[7] .............................................. H03K 7/06
(52) U.S. Cl. ..................................... 375/239; 375/355
(58) Field of Search ................................ 375/239, 355; 329/313

(56) References Cited

U.S. PATENT DOCUMENTS

| | | | | |
|---|---|---|---|---|
| 4,358,853 A | * | 11/1982 | Qureshi | 375/296 |
| 4,802,190 A | * | 1/1989 | Schouhamer Immink | 375/260 |
| 6,205,183 B1 | * | 3/2001 | Dent | 375/261 |

* cited by examiner

*Primary Examiner*—Don N. Vo
*Assistant Examiner*—Qutbuddin Ghulamali
(74) *Attorney, Agent, or Firm*—Michael J. Ure

(57) ABSTRACT

In an arrangement for determining the phase position of a data signal in the form of digital sampling values, comprising asynchronous modulated data having a known modulation frequency, a possible simple structure of the arrangement is ensured in that the arrangement comprises means (3, 4) performing a first and/or a second method of determining the bit positions of the sampled data signal, in that in the first method at least a set of three or five consecutive sampling values is searched whose mean sampling value is larger than or smaller than the neighboring outer sampling values of the set and in which the difference(s) of those outer sampling values being equidistantly spaced apart from the central sampling value fall below a predetermined threshold value, while upon detection of such a data set the position of the central sampling value and an associated position number indicating the position of the bits in the data signal are stored in a memory (9), in that in the second method a set of four consecutive sampling values is searched whose two central sampling values are approximately equally large and whose central value is smaller or larger than the central value of the two outer sampling values and in which the difference of the outer sampling values falls below a predetermined threshold value, while upon detection of such a data set the bit position in the center between the two central sampling values and an associated position number are stored in a memory (10), and in that the arrangement determines a phase signal from at least two determined bit positions, the position numbers assigned thereto and the period length of the bits of the data signal, which phase signal supplies the phase position of the bits of the sampled data signal relative to a predeterminable starting point.

15 Claims, 2 Drawing Sheets

ARRANGEMENT FOR DETERMINING THE PHASE POSITION OF A DATA SIGNAL

Figure 1:
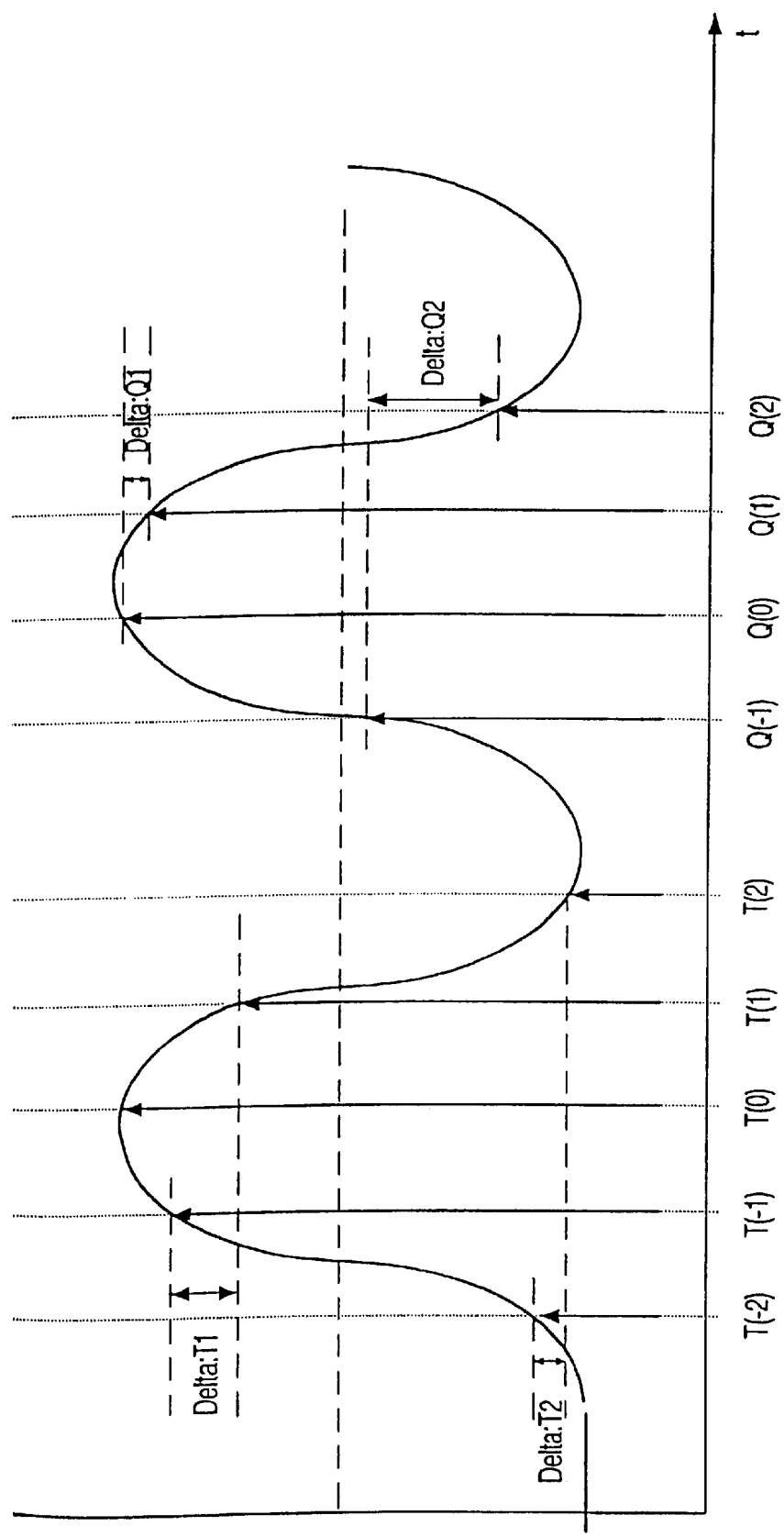

The invention relates to an arrangement for determining the phase position of a data signal in the form of digital sampling values, comprising asynchronous modulated data having a known modulation frequency.

A data signal whose bits or data are modulated asynchronously but whose modulation frequency is known may have different phase positions which are to be determined. The data signal is present in the form of digital sampling values. Particularly when the sampling frequency at which the digital sampling values are gained is not coupled to the modulation frequency of the data, it is not known which sampling value represents which bit and where this sampling value is located within this bit. Considerable problems then occur when decoding the bits, or the decoding may be liable to disturbances, for example, noise.

To solve this problem, a signal-separating device is known from EP-A-0 472 756 which is used for separating a teletext signal from a video signal. The circuit operates in a very elaborate way and includes an integrating device which supplies a half-position signal characterizing the signal means of the individual bits of the data signal, and a residual value signal. A residual value signal evaluation device evaluates each residual value and determines, by means of a selection control signal, how the value of the current signal bit is to be evaluated. To this end, a selection device is available which forms the respective leading mean value or the trailing mean value from each current sampling value and each previous or subsequent sampling value and, by means of the selection control signal, selects the value suitable for the evaluation. A further phase correction device evaluates a signal sample supplied by a slope logic device, indicating whether the current sampling value approximates a slope of a signal. The same device then controls a change of the integration period when the residual value signal is within a predetermined residual value signal range. This arrangement operates in a very elaborate manner and can only perform a kind of estimation of the position of the individual bits.

It is an object of the invention to provide an arrangement of the type described in the opening paragraph, which is capable of determining the phase position of the individual bits, solves the above-mentioned problems, has a possibly simple construction and may at least partly be realized also in software.

According to the invention, this object is solved in that the arrangement comprises means performing a first and/or a second method of determining the bit positions of the sampled data signal, in that in the first method at least a set of three or five consecutive sampling values is searched whose mean sampling value is larger than or smaller than the neighboring outer sampling values of the set and in which the difference(s) of those outer sampling values being equidistantly spaced apart from the central sampling value fall below a predetermined threshold value, while upon detection of such a data set the position of the central sampling value and an associated position number indicating the position of the bits in the data signal are stored in a memory, in that in the second method a set of four consecutive sampling values is searched whose two central sampling values are approximately equally large and whose central value is smaller or larger than the central value of the two outer sampling values and in which the difference of the outer sampling values falls below a predetermined threshold value, while upon detection of such a data set the bit position in the center between the two central sampling values and an associated position number are stored in a memory (10), and in that the arrangement determines a phase signal from at least two determined bit positions, the position numbers assigned thereto and the period length of the bits of the data signal, which phase signal supplies the phase position of the bits of the sampled data signal relative to a predeterminable starting point.

In the invention, the phase position of the individual bits of the asynchronous modulated data are determined, while a subsequent decoder, which does not form part of the invention and which determines the data, receives a phase signal indicating, to the decoder, the phase position of the asynchronous modulated data in the data signal.

This problem may even be greater in that in the case of an unfixed coupling of the sampling frequency at which the digital sampling values of the data signal are generated and the modulation frequency at which the data in the data signal are modulated the phase position is not fixed or is not known. Then there is a drift between the individual sampling values and the position of the bits in the data signal. It is thus not known which sampling value represents which data bit or where this sampling value is located within the signal variation of this bit.

It is exactly this problem that the invention should solve and supply a phase signal indicating to a subsequent decoder the phase position of the modulated bits of the data signal relative to a predeterminable starting point.

To be able to supply such a phase signal, the arrangement according to the invention must be capable of determining the exact position of the bits in the data signal. For this purpose, the arrangement comprises means which perform a first and/or a second method in which the bit positions of the sampled data signals are determined. In this method, given bit positions having a marked position relative to the sampling values are selected, for example, within a predeterminable time interval or data interval of the data signal, so that the position of the bits can be concluded relatively precisely from the sampling values.

In the first method, these means select a set of three or five consecutive sampling values, for which the following conditions apply. The central sampling value of these three or five or more sampling values must be larger or smaller than all of its neighboring outer sampling values, i.e. than the other two or four sampling values of this set of sampling values. Furthermore, the difference between the outer sampling values, each being equidistantly spaced apart from the central sampling value, must be minimal. Thus, when three sampling values in one set are used in this method, the difference between these two values must be minimal. When five sampling values in one set are used for performing this method, the difference between the first and the last sampling value of this set of sampling values must be minimal and, furthermore, the difference between the second and the fourth sampling value of this set must also be minimal.

When a set of consecutive sampling values is found, for which these conditions have been fulfilled, it can be assumed that the central sampling value of this set of sampling values quite exactly represents a maximum or a minimum in the signal variation of the data signal. This sampling value thereby fairly exactly represents a central position of a bit in the data signal. Since exactly this bit is searched, the position of the central sampling value is stored in a memory when detecting such a data set for which the conditions described above have been fulfilled. Furthermore, the position of this bit in the data signal is stored, i.e., for example, which bit as from a predeterminable starting point is concerned. Also this value is stored as a position number in the memory.

After performing the first method, for example, for a given period of time or a given section of the data signal, a plurality of bit positions is found for which the conditions described above have been fulfilled and whose position numbers are then stored in the memory.

Additionally or alternatively to the first method, the means perform a second method in which a set of four consecutive sampling values is searched, in which the difference between the two central sampling values falls below a predetermined threshold value and in which these two sampling values are both smaller or both larger than the two outer sampling values of this set. Furthermore, the difference between the outer sampling values may have to fall below a predetermined threshold value. When such a data set is found, it can be concluded that the center of the bits to which this data set belongs fairly exactly indicates a position between the positions of the two central sampling values. A bit position in the center between these two sampling values and again the associated position number indicating the position of the bit in the data signal is thus stored in a memory. Here again, it holds that during performance of the method a plurality of such data sets complying with the above-mentioned conditions is found.

The arrangement now determines the phase signal from the stored bit positions and position numbers. This is possible because the length of the bits, i.e. their period length, is also known by virtue of the known modulation frequency. At least two of the stored determined bit positions are used, while it is known which positions these bit have and which one of the bits is concerned. It is also known, for example, for two stored bit positions by how many bits these positions are spaced apart and which positions the centers of these bits have. When the distance between the centers of the bits, the positions of the centers of the bits and the period length are known, the phase position can thus be directly determined from these two known values. By evaluating the quality of the individual measuring points, the exactness of the phase position to be determined can be enhanced. The arrangement is thus capable of indicating the phase position of the data signal or the phase position of the bits of this sampled data signal relative to a predeterminable starting point.

For a subsequent decoder, which is not a subject of the invention, it is thus simply possible to decode the bits because the positions of the centers of the bits in the data signal is exactly known to the subsequent decoder by virtue of the phase signal. The decoder can thus directly determine the positions of the sampling values relative to these centers of the bits so that it can perform an optimal decoding operation.

For determining the phase signal, at least two of the determined bit positions are to be used but the exactness of the method may be further enhanced in that more than two of the bit positions found are used for determining the phase signal.

The arrangement operates quite simply because only differences are to be formed for performing the method and further estimations are not necessary. Using relatively simple computations, the bit positions and also the phase signal can be determined. The functions performed by the arrangement are completely or partly realizable also in software.

An embodiment of the invention as defined in claim 2 ensures that the two methods of determining the positions of the bits in the data signal are used for the synchronizing bits in the data signal which precede, for example, a frame of data bits. The phase signal may then be gained from these synchronizing bits, which phase signal may be used for data bits transmitted after the synchronizing bits in the data signal. After transmission of the synchronizing bits, the phase position of the data signal for the next data block is known and a possibly subsequent decoder may receive an optimal phase signal for decoding the data bits.

In a further embodiment of the invention as defined in claim 3, only one of the bit positions found and stored in accordance with the first and the second method is used for generating the phase signal, using a minimal number of components. When easily distinguishable phase positions result from the stored bit positions, a mean value is formed between them and supplied as a phase signal. A quite precise phase signal can thus still be generated, while using a minimal number of components.

When position numbers assigned to a plurality of bit positions are determined and stored in the memory in the two methods, it is possible, in accordance with a further embodiment as defined in claim 5, to advantageously make a qualitative selection therefrom. This may be advantageously effected in that those sets of sampling values are used for which the differences do not only fall below the predetermined threshold values but are also minimal. This means that those data sets are used whose above-described differences are smallest. It is highly probable that those data sets are then found which best indicate the exact central position of each bit in the data signal.

As described hereinbefore, the arrangement can compute the phase signal from the stored bit positions, the associated position numbers and the known modulation frequency. Conversely, as in an embodiment of the invention as defined in claim 6, the modulation frequency of the data signal can be determined from the distances between the determined bit positions and the associated position numbers. This information may be used, for example, for identifying the data signal, i.e. so as to test whether the modulation frequency corresponds to the expected modulation frequency, or to determine by means of the modulation frequency which type of data signal is concerned. When the data signal is a teletext signal of a video signal, this information may be used, for example, for determining the transmission standard of the teletext signal.

In a further embodiment of the invention, as defined in claim 7, an error signal may be advantageously triggered in the arrangement when not at least one predetermined number of bit numbers is determined within a predetermined time interval. Then it can be assumed that it is either not the expected data signal or a disturbed data signal.

In a further embodiment as defined in claim 8, the arrangement may be advantageously used for determining the phase position of teletext signals within a television signal. The position of the teletext bits within a picture line of the television signal may fluctuate. To nevertheless enable a subsequent decoder to perform a reliable decoding operation, the arrangement according to the invention may advantageously supply a phase signal for each picture line.

In a further embodiment of the invention as defined in claim 10, the slope detector may be employed in the methods described above only for those sampling values that are associated with pulses having at least a predetermined slope height. It can thereby be achieved in that single interference peaks within the data signal are not recognized as bit position. Furthermore, as defined in this claim, a subsequent bit counter is controlled by means of the output signal of the slope detector, which bit counter directly supplies the position numbers of the individual bits and whose value can be directly used as a position number to be stored when carrying out the methods.

These and other aspects of the invention are apparent from and will be elucidated with reference to the embodiments described hereinafter.

Figure 2:
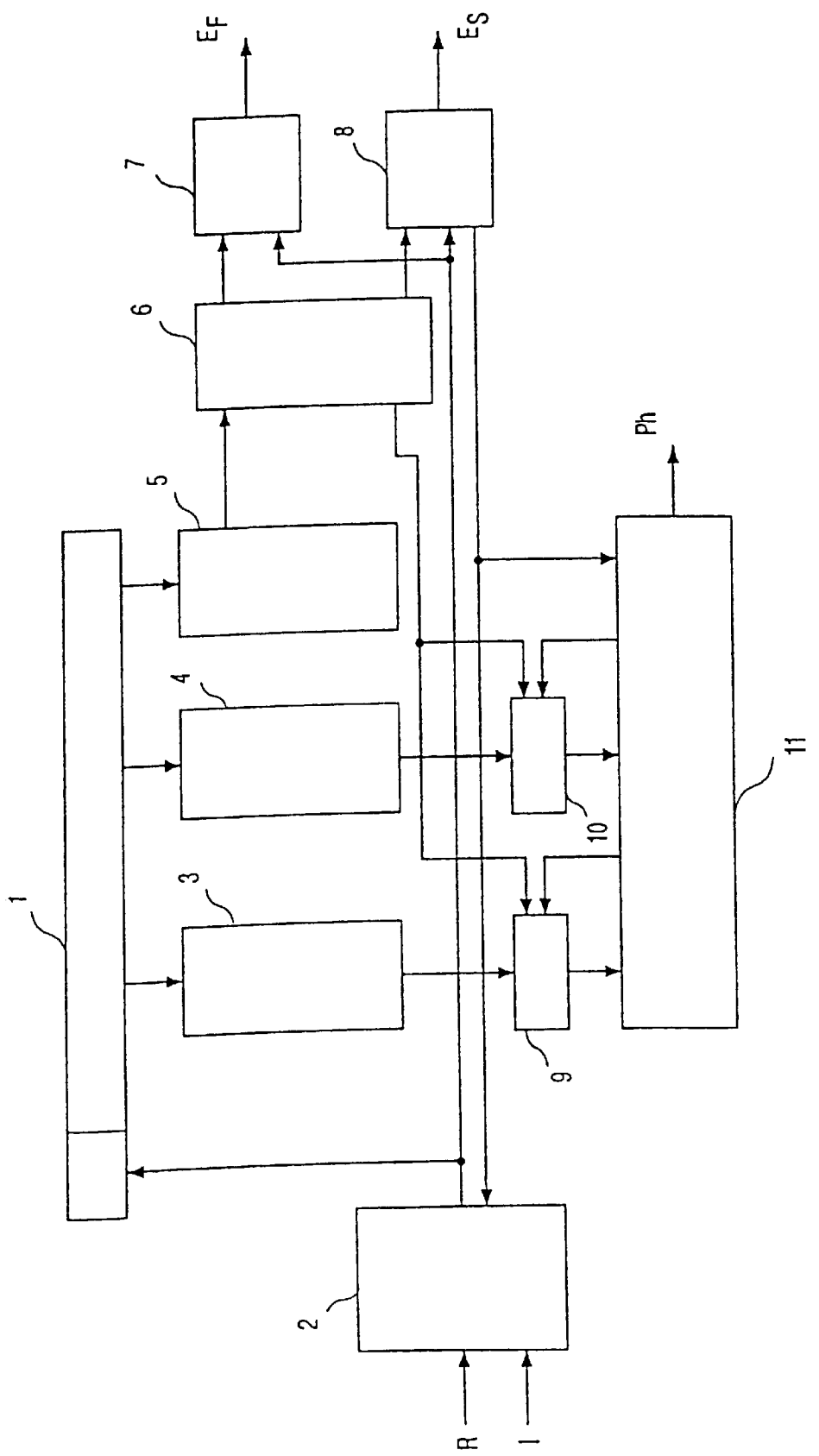

In the Drawings:

FIG. 1 shows two curves as a function of time of an asynchronous modulated data signal, elucidating with reference to these two curves, the two methods performed by the means in the arrangement, and FIG. 2 is a block diagram of an arrangement according to the invention for generating a phase signal.

For the embodiment to be described hereinafter it is assumed that the asynchronous modulated data signal is a sampled teletext signal. The teletext signal is line-sequentially transmitted within a television signal. In each picture line of the television signal, in which bits of the teletext signal are transmitted, some synchronizing bits are initially transmitted, with reference to which the arrangement according to the invention supplies the phase signal which is subsequently used for determining positions of data bits subsequently transmitted within each picture line in the teletext signal. This phase signal may be advantageously used for decoding the bits in a subsequent decoder, which is not a subject of the invention, since on the basis of this phase signal the exact position of the bits relative to the sampling values is known. The decoding operation is, however, not a subject of the invention, which has for its object to supply a phase signal allowing optimal decoding.

For decoding such a teletext signal, the arrangement according to the invention supplies a phase signal individually for each bit line, which phase signal indicates, for each bit line, the phase position of the teletext bits relative to a predeterminable starting point. This is necessary because the positions of the bits or the phase position of the teletext signal may fluctuate from picture line to picture line.

FIG. 1 shows the curves as a function of time of two synchronizing bits and their sampling values and positions of such an analog teletext signal as is comprised, for example, in a television signal.

In FIG. 1, sampling values of this signal are further denoted by means of arrows. The Figure shows that, because of the uncoupled sampling frequency at which the sampling values are generated, these values may be arbitrarily shifted with respect to the bit positions of the synchronizing bits and may also drift due to the possibly uncoupled frequencies.

The example in FIG. 1 is used to explain the two methods, the first method being explained with reference to the first bit shown in FIG. 1 and the second method being explained with reference to the second bit shown in FIG. 1.

In the first method, a set of sampling values is searched for which two conditions must be fulfilled. The central sampling value must have a larger or a smaller value than two or four neighboring sampling values. Furthermore, the differences between the neighboring sampling values must be minimal, while each time the difference between sampling values each having the same positions relative to the central sampling value is computed. These differences must each fall below a predetermined threshold value. When this is the case, the determined bit position corresponding to the position of the central sampling value of this data set is stored. Furthermore, the associated position number indicating the position of the bit in the data signal is stored.

In the example shown in FIG. 1, a central sampling value T(0) is shown whose value is larger than the values of the directly neighboring sampling values T(−1) and T(1). Furthermore, it is larger than every second neighbor T(−2) and T(2).

For performing the first method, either a set of three sampling values or a set of five sampling values may be used, dependent on the desired accuracy and the computing effort.

Furthermore, the condition should be fulfilled that the difference between the neighboring sampling values T(−1) and T(1) falls below a predetermined threshold value. This difference is denoted by Delta T1 in the Figure.

When the method is performed while using sets of five sampling values, the difference between the sampling values T(−2) and T(2) denoted by Delta T2 in the Figure should also be used. This difference of Delta T2 must also fall below a predetermined threshold value.

When it is assumed in the example shown in FIG. 1 that both the difference Delta T1 and the difference Delta T2 fall below the respective associated thresholds, then the set of values T(0), T(−1), T(1), T(−2) and T(2) fulfills the conditions described above. A central position of a bit has then been found. This central position is characterized by the position of the sampling value T(0). Its position is stored as bit position in a memory. Furthermore, a position number is stored, indicating which bit is involved. This position number may be determined, for example, by a slope detector. However, the position number may also be gained with reference to one of the two methods because the positions of the individual bits are determined by means of the methods. Also when bit positions do not fulfill the conditions of the two methods, it is still possible to count the bits. The position number may be determined from this information and stored, together with the bit position of the sampling value T(0), in a memory.

The second method will hereinafter be elucidated with reference to the second curve shown in FIG. 1.

The conditions of the second method are that the values of the two central sampling values, in the example of FIG. 1 the values Q(0) and Q(1) are larger or smaller than the neighboring sampling values Q(−1) and Q(2) in the example.

In the example shown in FIG. 1, this condition is fulfilled for the second characteristic curve.

Furthermore, the differences between the two central sampling values Q(0) and Q(1) and the outer sampling values Q(−1) and Q(2) must fall below predetermined threshold values. In FIG. 1, these differences are denoted by Delta Q1 and Delta Q2. When these two differences fall below the predetermined threshold values, a bit position has been found by means of the second method which has approximately a central position between the two sampling values Q(0) and Q(1). This position is stored as bit position together with the position number.

A phase signal indicating the phase position of the bits of the data signal relative to a predeterminable starting point can be directly computed from the stored bit positions and the associated position numbers at a known modulation frequency of the data signal and thus a known period length of the bits of the data signal.

For determining the phase signal, the bit positions and the associated position numbers determined by means of the first and/or the second method may be used. In the simplest case, one bit position per method is determined and used for determining the phase signal. However, per method, a plurality of bit positions may be determined from which those ones are selected for which the above-described differences are minimal. The phase positions to be determined with reference to the individual bit positions may slightly deviate from each other. In this case, a mean value may be advantageously gained from the phase positions and supplied as a phase signal.

A block diagram in FIG. 2 shows an arrangement according to the invention for determining the phase position of a data signal. The data signal may be, for example, a teletext signal. The teletext signal is sampled at a sampling frequency which is not coupled to the modulation frequency of the bits of the teletext signal. The corresponding sampling values are stored in a buffer memory 1 in the arrangement shown in FIG. 1. This may be effected, for example, for all sampling values of a picture line of the television signal.

The arrangement includes an address counter 2 which receives a reset signal R read, for example, at the start of every new picture line in such a way that the residual counter resumes its count. Furthermore, the address counter 2 receives an increment signal so that the address counter 2 counts up with this increment signal and the individual sampling values of, for example, a picture line are addressed one after the other in the buffer memory 1.

The bits thus addressed one after the other are applied to means 3 for performing the first method and means 4 for performing the second method.

The means 3 and 4 determine data sets in the manner described above, for which the relevant conditions of the two methods have been fulfilled. The bit positions then determined are stored in a first memory 9 and in a second memory 10.

Furthermore, a slope detector 5 is provided which identifies the individual bits with reference to the consecutively addressed sampling values. This is done in such a way that only those bits are taken into account which, dependent on the sampling values, have at least a predetermined slope height. The subsequently arranged bit counter 6 counts these bits.

When a bit position has been determined by means of the means 3 or 4 in performing the two methods, the relevant bit number or position number supplied by the counter 6 is also stored together with this bit position in the memory 9 or the memory 10, respectively. The position number supplied by the counter 6 and associated with each bit position is thus stored in the memory 9 or 10, respectively.

Furthermore, the overall arrangement includes a unit 11 for determining the phase signal. This unit 11 may have access to bit positions and associated position numbers stored in the memories 9 and 10 and read them. With reference to the stored bit positions and position numbers, the unit 11 determines a phase signal Ph which it makes available for possibly subsequent decoders, which are not subject of the invention.

Both in performing the two methods by means of the means 3 and 4 and in the evaluation by means of the unit 11, fundamentally different procedures are possible.

It is sufficient to fundamentally use only one method. Alternatively, either the means 3 or the means 4 may thus be present.

Furthermore, both means 3 and 4 may be provided but only one value obtained in the two methods from the bit positions in the memories 9 and 10 can be used in the unit 11 for determining the phase signal.

Furthermore, it is possible to select, from possibly more bit positions stored in the memory 9 or 10, those bit positions for determining the phase signal for which the differences to be computed are minimal. Thus, a qualitative selection of the bit positions can be made.

Moreover, a slightly differing phase position may result from the stored bit positions and position numbers. In this case, a mean value is gained from the phase positions and supplied as phase signal Ph.

In the simplest case, only one bit position together with the associated position number is gained from the memories 9 and 10. The phase position can be determined from these two bit positions and supplied as phase signal Ph.

The arrangement further comprises a unit 7 for testing the frequency and a unit 8 for testing errors. These two units are basically optional; they may, however, enhance the reliability of the arrangement.

The unit 7 for testing the frequency supplies an error signal EF which appears when the modulation frequency of the data signal is not within a predetermined range. Then it can be concluded that the signal concerned is not the desired data signal. This frequency may be determined by the unit 7 from the number of determined bits supplied by the bit counter 6 and the number of addresses supplied by the address counter 2. When this frequency is not within a predetermined range, the frequency error signal $E_F$ is supplied and the arrangement stops the computation of the phase signal Ph.

The unit 8 for testing errors counts those bits which are recognized within a predetermined time interval. The time interval is determined by the address data of the address counter and the number of bits is obtained from the bit counter 6. When a minimum number of bits is not recognized within a predetermined time interval, the arrangement also stops determining the phase signal Ph. This is effected by the unit 8 which supplies a corresponding error signal to the address counter 2 and to the unit 11 for determining the phase signal.

In FIG. 2, the arrangement is shown in the form of a block diagram whose components can be realized in hardware. However, a realization in software is alternatively possible and may also comprise only separate components.

Overall, the arrangement according to the invention has a relatively simple structure. Particularly the computing processes to be performed are very simple since only simple subtractions or counting processes are involved.

What is claimed is:

1. An arrangement for determining the phase position of a sampled data signal comprising:

a memory;

means for performing a first or a second method of determining bit positions of the sampled data signal;

wherein the first method uses at least a set of three or five consecutive sampled values that are searched for a mean sampling value that is larger than or smaller than the neighboring outer sampling values of the set, and wherein the difference(s) of the outer sampling values are equidistantly spaced apart from the central sampling value and fall below a predetermined threshold value, and upon detection of such a data set the position of the central sampling value and an associated position number indicating the position of the bits in the data signal are stored in the memory, wherein the second method uses a set of four consecutive sampling values that are searched for two central sampling values that are approximately equal and the central value is smaller or larger than the central value of the two outer sampling values and wherein the difference of the outer sampling values falls below a predetermined threshold value, and upon detection of such a data set the bit position in the center between the two central sampling values and an associated position number are stored in the memory; and means for determining a phase signal using the at least two determined bit positions, the position numbers and the period length of the bits of the data signal.

2. The arrangement as claimed in claim 1, wherein the arrangement uses both methods for the synchronizing bits provided in the data signal and makes available the determined phase signal for determining data bits which are transmitted in the data signal after the synchronizing bits.

3. The arrangement as claimed in claim 1, wherein the arrangement determines at least a set of sampling values that best complies with the conditions using the first and the second method, and for determining the phase signal, a mean value is selected from the bit positions determined using both methods and the resultant phase positions.

4. The arrangement as claimed in claim 1 or 2, wherein in the first method, three sampling values constitute a set of sampling values.

5. The arrangement as claimed in claim 1, wherein the arrangement determines a plurality of bit positions and associated position numbers using both methods and makes a qualitative selection wherein bit positions are selected and used for determining the phase signal, wherein the bit positions were determined from the sets of sampling values for which the difference of the outer sampling values is minimal.

6. The arrangement as claimed in claim 1, wherein the arrangement determines a modulation frequency of the data signal from the relative distances between the determined bit positions and the assigned position numbers, the modulation frequency being used for identifying the data signal.

7. An arrangement as claimed in claim 1, wherein the arrangement triggers an error signal when not at least one predetermined number of bit numbers is determined within a predetermined time interval.

8. The arrangement as claimed in claim 1, wherein the data signal is a teletext signal of a television signal which was sampled at a sampling frequency coupled to the line frequency of the television signal and which is preferably approximately 13.5 MHz.

9. The arrangement as claimed in claim 1 or 8, wherein the sampling frequency is not coupled to the modulation frequency.

10. The arrangement as claimed in claim 1, wherein the arrangement comprises a slope detector whose output signal is used to include, in the method, only those sampling values which are associated with pulses having at least a predetermined slope height, and in that the position numbers are determined by means of the output signal of the slope detector and a subsequent bit counter.

11. The arrangement as claimed in claim 1, wherein the phase signal supplies the phase position of the bits of the sampled data signal relative to a predeterminable starting point.

12. The arrangement as claimed in claim 1, wherein the arrangement uses both the first and second method of determining bit positions of the sampled data signal.

13. An arrangement for determining the phase position of a sampled data signal comprising:
 a memory; and
 a processor configured to (1) use a first or a second method of determining bit positions of the sampled data signal and (2) determine a phase signal using at least two determined bit positions;
 wherein the first method uses at least a set of three or five consecutive sampled values that are searched for a mean sampling value that is larger than or smaller than the neighboring outer sampling values of the set, and wherein the difference(s) of the outer sampling values are spaced apart from the central sampling value and fall below a predetermined threshold value, to determine the at least two bit positions,
 wherein the second method uses a set of four consecutive sampling values that are searched for two central sampling values that are approximately equal and the central value is smaller or larger than the central value of the two outer sampling values and wherein the difference of the outer sampling values falls below a predetermined threshold value, to determine the at least two bit positions.

14. The arrangement as claimed in claim 13, wherein the at least two bit positions are determined using a data set from the first or second method wherein (1) the position of the central sampling value and an associated position number indicating the position of the bits in the data signal are stored in the memory, or (2) the position in the center between the two central sampling values and an associated position number are stored in the memory.

15. The arrangement as claimed in claim 13, wherein the arrangement uses both the first and second method of determining bit positions of the sampled data signal.

* * * * *